United States Patent [19]

Jouppi

[11] Patent Number: 5,689,679
[45] Date of Patent: Nov. 18, 1997

[54] MEMORY SYSTEM AND METHOD FOR SELECTIVE MULTI-LEVEL CACHING USING A CACHE LEVEL CODE

[75] Inventor: Norman Paul Jouppi, Palo Alto, Calif.

[73] Assignee: Digital Equipment Corporation, Maynard, Mass.

[21] Appl. No.: 610,901

[22] Filed: Mar. 5, 1996

Related U.S. Application Data

[63] Continuation of Ser. No. 55,232, Apr. 28, 1993, abandoned.

[51] Int. Cl.$^6$ .................................. G06F 12/08; G06F 13/00
[52] U.S. Cl. ........................ 395/449; 395/466; 395/403
[58] Field of Search ............................. 395/444, 446, 395/449, 465, 466, 471, 472, 473, 483, 403, 445

[56] References Cited

U.S. PATENT DOCUMENTS

| | | | |
|---|---|---|---|
| 3,735,360 | 5/1973 | Anderson et al. | 395/250 |
| 3,771,137 | 11/1973 | Barner et al. | 395/447 |
| 4,173,781 | 11/1979 | Cencier | 395/444 |
| 4,442,487 | 4/1984 | Fletcher et al. | 395/449 |
| 4,464,712 | 8/1984 | Fletcher | 395/449 |
| 4,755,930 | 7/1988 | Wilson, Jr. et al. | 395/449 |
| 4,797,814 | 1/1989 | Brenza | 395/403 |
| 4,807,110 | 2/1989 | Pomerene et al. | 395/421.03 |
| 4,823,259 | 4/1989 | Aichelmann, Jr. et al. | 395/449 |
| 5,136,700 | 8/1992 | Thacker | 395/449 |
| 5,214,765 | 5/1993 | Jensen | 395/449 |
| 5,249,282 | 9/1993 | Segers | 395/449 |
| 5,261,066 | 11/1993 | Jouppi et al. | 395/449 |
| 5,276,848 | 1/1994 | Gallagher et al. | 395/448 |
| 5,285,323 | 2/1994 | Hetherington et al. | 395/449 |
| 5,359,723 | 10/1994 | Mathews et al. | 395/449 |

OTHER PUBLICATIONS

Smith, A.J., "Cache Memories", *Computing Surveys*, vol. 14, No. 3, pp. 473–530 (Sep. 1982).

*Digital Technical Journal*, NVAX–microprocessor VAX Systems, vol. 4 No. 3, Summer 1992, Digital Equipment Corporation, pp. 62–63.

*Digital Technical Journal*, Alpha AXP Architecture and Systems, vol. 4 No. 4, Special Issue 1992, Digital Equipment Corporation, pp. 66–70 and 100–105.

*Computer Architecture A Quantitative Approach* 2d Ed. John 1. Hennessy & David Patterson, pp. 461–465.

*Computer Programming and Architecture The VAX*, Levy & Eckhouse, Jr., pp. 340–343 (Multilevel Caches), 1989.

*Digital Technical Journal*, VAX–based Systems, No. 7, Aug. 1988, Digital Equipment Corporation, pp. 28–29, 35–38, 41–42, 99.

*Digital Technical Journal*, Vax 9000 Series, vol. 2 No. 4, Fall 1990, Digital Equipment Corporation, pp. 16, 23.

*Primary Examiner*—Glenn Gossage
*Attorney, Agent, or Firm*—Michael A. Rodriguez; James F. Thompson; A. Sidney Johnston

[57] ABSTRACT

A selective multilevel caching method and system including a main memory and a plurality of cache memories are disclosed. The main memory and cache memories are arranged in a multilevel hierarchy: the main memory is at the lowest hierarchical level; the cache memory that is coupled directly to the central processing unit (CPU) is at the highest hierarchical level; and the remaining cache memories are coupled in the hierarchy at intermediate hierarchical levels therebetween. Each hierarchical level contains cache logic as well as a cache memory. Each cache logic responds to a cache level code that is associated with an address specified in each CPU read or write data request. The cache level code specifies the highest hierarchical level at which data associated with the data request may be written. Each cache logic uses the cache level code to determine if data will be written to the cache memory at the same hierarchical level as that cache logic. Each CPU write request further includes a cache control code. The cache control code indicates whether each cache level is designated as a write-allocate cache level. Each cache logic responds also to the cache control code to further determine if data will be written to the cache memory at the same hierarchical level as that cache logic.

26 Claims, 13 Drawing Sheets

FIGURE 1–*Prior Art*

| 0 | 0 | • • • • • • • | 0 | 1 | 1 | 0 | 0 | 0 | 1 |
(63)(62) (6)(5) • • • (1)(0)

FIGURE 8

| 0 | 1 | • • • • • • • | 0 | 1 | 1 | 0 | 0 | 0 | 1 |
(63)(62) (6)(5) • • • (1)(0)

FIGURE 9

| 1 | 0 | • • • • • • • | 0 | 1 | 1 | 0 | 0 | 0 | 1 |
(63)(62) (6)(5) • • • (1)(0)

FIGURE 10

| 1 | 1 | • • • • • • • | 0 | 1 | 1 | 0 | 0 | 0 | 1 |
(63)(62) (6)(5) • • • (1)(0)

FIGURE 11

MEMORY SYSTEM AND METHOD FOR SELECTIVE MULTI-LEVEL CACHING USING A CACHE LEVEL CODE

This application is a continuation of application Ser. No. 08/055,232, filed Apr. 28, 1993, now abandoned.

The present invention relates generally to computer systems which include multilevel cache memories, and in particular to a system and method for selective multilevel caching.

BACKGROUND OF THE INVENTION

Access time to a computer system's main memory upon the request by the central processor for instructions or data can engender considerable delays, which are bottlenecks for the entire system's operation. Much study has been devoted to architecture design to reduce this access time.

To this end a cache memory may be used, positioned between the processor and the main memory. The cache memory will typically be a static random access memory (SRAM), which provides faster access time than the dynamic random access memory (DRAM) typically used for the main memory of the computer. SRAM is more expensive than DRAM, however, and therefore it is uneconomical to use it for the main memory.

Successive data read requests to a computer's memory often access blocks of data which are adjacent one another in the address space of the main memory, such as successive program instructions of an application or related mathematical or other data to be used by the application. Moreover, especially in the latter case, most of the instructions and data are used more than once. Indeed for many mathematical operations, such as in matrix mathematics where rows and columns of a given matrix are used multiple times, the data is used many times in rapid succession.

Instruction load time constitutes a significant percentage of the total execution time of an application. Also, instructions are accessed repeatedly when loops are executed. Since most program time is spent in loops, an instruction once executed is likely to be executed again soon. This pattern is known as temporal locality.

In addition, instructions and often data tend to be accessed sequentially, so it can be expected upon loading a given data or instruction block from main memory that nearby blocks will be needed shortly. This is known as spatial locality.

In each of these cases, significant processing time can be saved by the caching of instructions and data, i.e. the storing both of requested data blocks and of adjacent blocks in the cache memory. This makes all of the cached data available for rapid access at later steps, without the need for further requests to the main memory.

Multilevel cache memory systems have been developed to provide even greater efficiency. A multilevel caching system may include, for instance, two cache memories between the processor and the main memory, with the first-level cache memory, coupled directly to the processor, being particularly fast and relatively small, and the second level cache memory, coupled between the first level cache memory and the main memory, being slower but larger than the first level cache memory, and smaller but faster than the main memory.

In such a multilevel cache system, the contents of each level of cache memory are also present at each lower level. When a data request is made, the system first searches at the highest level cache. If the data is not found there, a data "miss" signal is sent to the next level, and the data is also sought there. If the data is not found at this level it is sought at the next level down, and so on until it is sought at the main memory level. It is then retrieved, and written at each cache level in turn, and is finally passed by a local data bus to the central processor. Thus, the retrieved data is now present at each of the cache levels for rapid retrieval in case it is requested again.

This process will be described in connection with FIG. 1, which is a block diagram of a conventional two-level cache system. A central processor circuit 10 includes a central processing unit (CPU) 20 and a translation lookaside buffer (TLB) 30.

When a particular block of data is needed by the CPU 20, it issues a data read request over a control bus 40, and sends the virtual address of the block of data to the TLB 30 over a virtual address bus 60. The data read request control signal is also sent to the TLB over a bus 70. The TLB 30 determines the real (or physical) address corresponding to the requested virtual address, the real address being the location of the requested data block in the main memory. The TLB sends the real address via an address bus 80 to the first cache memory 90, which is at level 1.

Upon receiving a read request over control bus 40 and a real address over bus 0, the first cache memory 90 attempts to fill the request, determining whether the requested data is stored at one of its addresses. The cache memory 90 may use direct mapping, associative mapping, or another mapping scheme to map the real addresses onto its own internal addresses. If the requested block of data is found in the first cache memory, it is output onto the data bus 50 and returned to the CPU 20.

If the request cannot be fulfilled at the level of the first cache memory, cache control logic (not separately shown) of cache level 1 sends a "miss" signal to cache memory 100 at level 2 via the control bus 110, and passes on the real address of the requested block of data over address line 130. The "miss" signal amounts to a request to cache level 2 to read the desired block of data from its memory. Cache level 2 then attempts to fulfill the request. If the block of data is found at this second level, a "hit" signal is passed over control bus 110 back to cache level 1, while the located block of data is sent to cache level 1 over the data bus 120. The "hit" signal acts as a write signal to cache level 1, which thus writes the block of data to its memory. Cache level 1 further passes the "hit" signal (over control bus 40) and the data (over data bus 50) to the CPU 20.

If the block of data is not found at level 2, the data request and address are passed via control bus 140 and address bus 160, respectively, to the main memory 170. The main memory sends the data along with a "hit" signal, via buses 150 and 140, respectively, to cache level 2, where the data is written, and the data and the "hit" signal are passed to level 1 (via buses 120 and 110, respectively), where the data is again written. The data and hit signal are finally passed to the CPU over buses 50 and 40, respectively.

This system is appropriate for many data and instruction requests from the CPU, but is often inefficient, especially where large data structures are to be accessed. For instance, vector operations may involve the reading and writing of thousands of elements before a given element is accessed again. In a single-level caching system with an 8 KB data cache and 8-byte blocks or lines, only one thousand blocks are stored in the cache memory. Thus, if the vector operation sequentially accesses several thousand 8-byte numbers (each being stored in one block), the contents of the data cache will be replaced several times over before a given number is needed again. When portions of a previously read vector are requested again in later vector references, the vector references to the data cache result in misses, and the data must again be retrieved from main memory. The caching of the vector data thus results in inefficient data access delays due both to the flushing of needed data from the cache and to the wasted time in vector reference misses.

For this reason, vector machines typically provide uncached loads and stores for vector operations. A needed vector can then be fetched directly from main memory, usually in the same time or less than that required for missing on each vector element in the cache. At the same time, blocks of data from other data structures can be cached as usual for later use.

In a system using multilevel caching, however, the use of uncached loading for particular types of loads means that every such load would need to go all the way to the main memory. The time used in doing so may be greater than that used for the alternative, namely using cached loads for the vector. In this instance, the vector data is placed in an intermediate level cache memory large enough to accommodate it, and accepting the inefficient flushing of data from the upper level cache(s) upon a vector reference. In a multilevel cache system, neither alternative is attractive for the loading of large data structures.

An example of where this problem arises is in gaussian elimination in matrix mathematics, wherein a given "pivot" row of a matrix is used repeatedly in successive operations with the other rows of the matrix. Once the pivot row has been used to reduce each of the other rows in the matrix, a new pivot row is selected, and a similar operation is recommenced. If one row of the matrix will fit into the first-level cache memory but the entire matrix will not, then it would be preferable to place the current pivot row in the first-level cache memory, since it is used repeatedly, and to access the entire matrix at a lower level in the hierarchy in which it fits. Since each row of the matrix becomes the pivot row at some point in the procedure, however, it would be helpful to designate these rows sometimes for caching at the highest level, and sometimes only for caching at the lower level where the entire matrix fits.

However, since in current systems each data item must be accessed in strictly a cached or an uncached fashion, this dichotomous treatment of the pivot row and the entire matrix cannot be accomplished. There are many situations in which it is desirable to prevent a large data structure from overwriting data in cache memories, but where it still would be useful to cache the data structures if it could be accomplished without such overwriting. What is needed, then, is a system which allows such fine control of cacheability, on a level-by-level basis with different caching levels specified for a given blocks of data at different times.

The use of uncached loads also presents a problem with data consistency. If an uncached load directly accesses a main memory location which has already been mapped in a cache memory, and if the data value in the cache memory has been written more recently than the value in the main memory, then the uncached load will be fetching an out-of-date, incorrect value from that main memory location. Care must therefore be taken in such a system that each data item is accessed only in a cached fashion or an uncached fashion, to avoid such data inconsistencies. This limits the flexibility of the system, such as by making uncached loads unusable in some situations where they would be desirable. In order to guard against accessing data which is not the latest version, a system with selectable caching levels must also include a means for maintaining data consistency.

Similar problems present themselves in the caching of data upon data write (store) commands, since data is cached when it is written to memory in a manner similar to when it is read from memory.

SUMMARY OF THE INVENTION

The present system provides level-by-level caching upon either read requests or write requests in a three-level (or other multilevel) caching system. Especially large data structures are cached at a predetermined level such as the lowest level, i.e. level three, but uncached at the upper two levels, thereby reducing the access time for the data structure as compared with current systems which use uncached loads or stores. At the same time, the first- and second-level cache memories are not flushed by the loading of large data structures, hence preserving their contents. Thus, the advantage previously accomplished only by using entirely uncached loads and stores (i.e., preserving the contents of the smaller upper caches) is presented by this system, while at the same time the access speed to the large data structure is increased due to its cached loading to level three.

Whenever a data load is requested, the system begins searching for the requested data from the top of the memory hierarchy downwards, and returns the data from the highest level at which it was found. If a reference misses at a given level, it generates a cache miss, and searches for the data at the next level down. The searching at all levels from the top down until the data is located ensures that the most recent copy of the data is supplied to the processor.

When the data is located, it is written to each cache level up to and including the predetermined level, as well as being passed to the processor. A given data item may be specified to be cached at different levels at different times during the execution of the program, to optimize the performance of the program.

In addition to being useful in procedures requiring matrix operations as discussed above, the system is also applicable to the copying of I/O buffers in computer operating systems. The buffer from which data is being read is preferably read with uncached loads (i.e., loading without storing in any of the cache memories), since the data in the buffer is read only once. However, all cache levels are still checked for buffer data, as described above, since buffer data may have been written to cache memory by a write command executed at an earlier time.

The buffer to which the buffer data is copied may be specified to be written, for example, to the third-level cache or below. Then, when the operating system interrupts an executing program in order to copy this buffer, the state of the program as represented by the instructions and data in the first- and second-level caches will not be disrupted, and the program will not undergo the numerous cache misses at the first and second levels which would otherwise occur upon resumption of execution. At the same time, the buffer data is available in the cache memory at level three, so that system need not go all the way to the main memory to retrieve it, resulting in time savings.

The caching of data in write operations is similar to that in read operations, taking into account whether the various cache levels are designated for write-through or write-back, on the one hand, and on the other hand whether they are designated for write-allocate. In addition, each item of data may be designated for write allocation or not at a given cache level which is selected by the user.

Control of the level to which requested data is cached may be accomplished in several ways, such as by: using control bits in the virtual addresses or the real addresses; storing a cache level code for each cache level with the load and store instructions in the instruction opcode; or by storing cache-level codes in the TLB, correlated with the real address to which the virtual addresses are mapped. A given data item may be designated for different caching behavior upon a read request than upon a write request, and furthermore may be designated for different caching behavior at different times in the execution of a program.

In an application using three-level selective caching, one cache-level code is assigned to each of the three levels of caching, and one code is assigned to the main memory (for uncached loads). A system with fewer levels of caching (such as two) may nonetheless utilize such an application, by lumping together, for instance, the second and third cache levels, so a that two-level selective caching scheme is accomplished from the generalized three-level scheme.

BRIEF DESCRIPTION OF THE DRAWINGS

FIGS. 8–11 depict the bits of 64-bit addresses controlling cache level selection.

DESCRIPTION OF THE PREFERRED EMBODIMENTS

Figure 1:
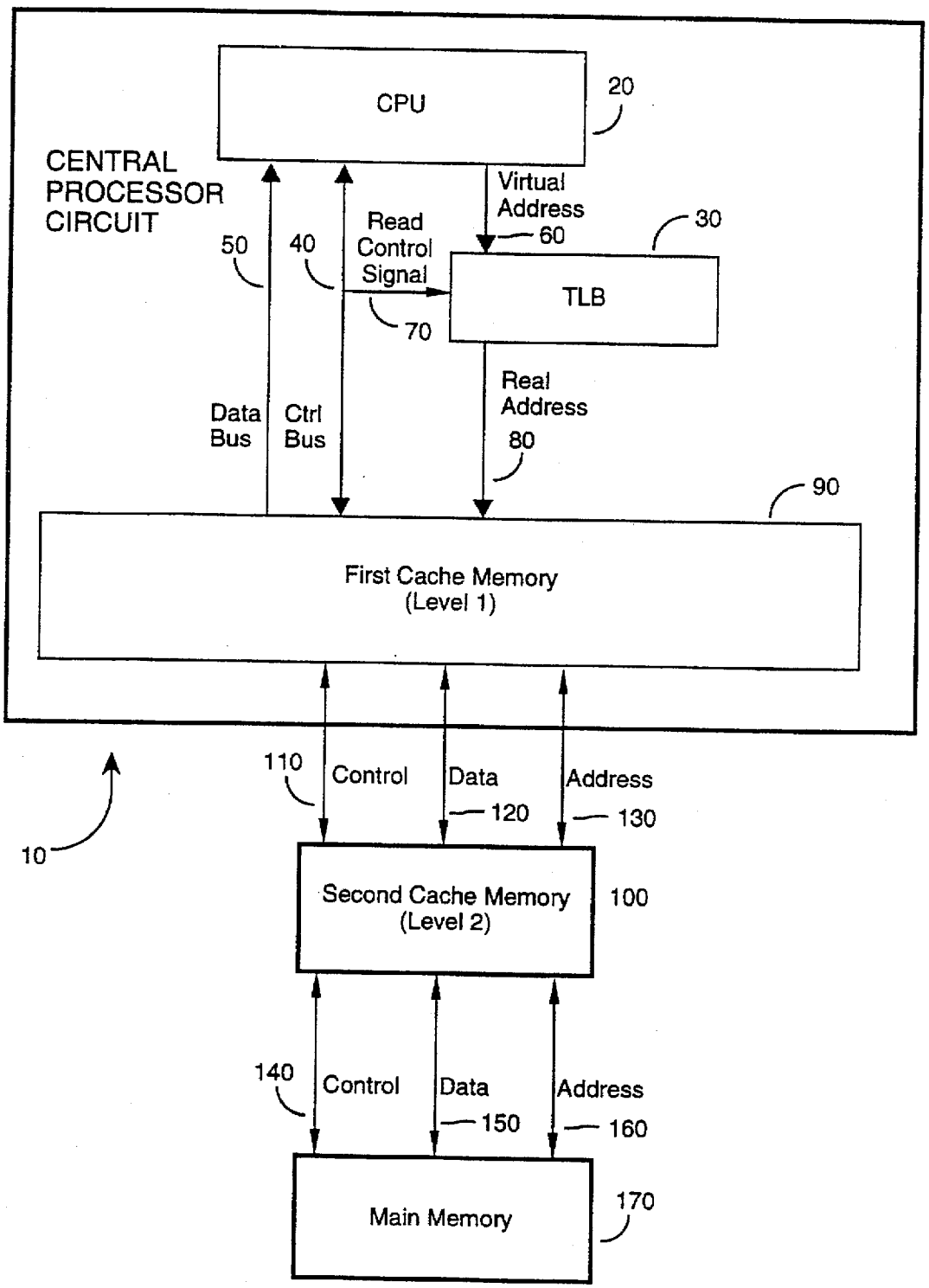
FIG. 1 is a block diagram of a conventional two-level cache memory.
Figure 2:
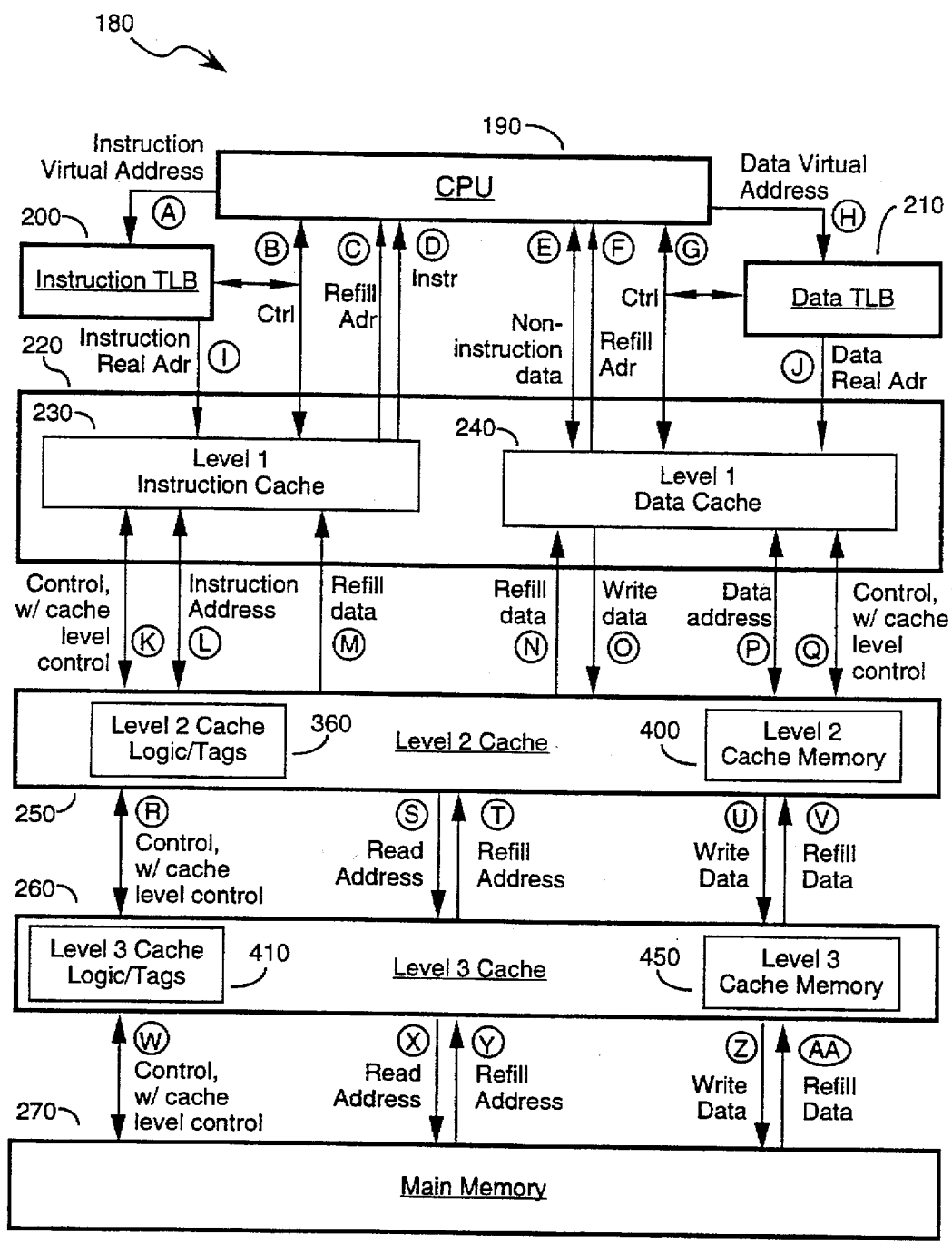
FIG. 2 is a block diagram of a system of the invention utilizing three-level caching.

A central processor circuit 180 is shown in FIG. 2, and incorporates a multilevel hierarchical caching system according to the present invention. This embodiment utilizes a three-level caching system coupled to a central processing unit (CPU) 190. The CPU uses separate TLBs, namely instruction TLB 200 and data TLB 210, in a manner to be described below. The instruction TLB 200 is coupled to a first cache level 220, and specifically to a level 1 instruction cache 230 of the first cache level 220. The data TLB 210 is likewise coupled to a data cache 240 of the first cache level 220.

The first cache level 220, at the highest level of the hierarchy, is coupled to a second cache level 250, which is in turn coupled to a third cache level 260, which is itself coupled to a main memory 270, which constitutes the lowest level of the hierarchy. The main memory 270 is preferably a DRAM.

Figure 3:
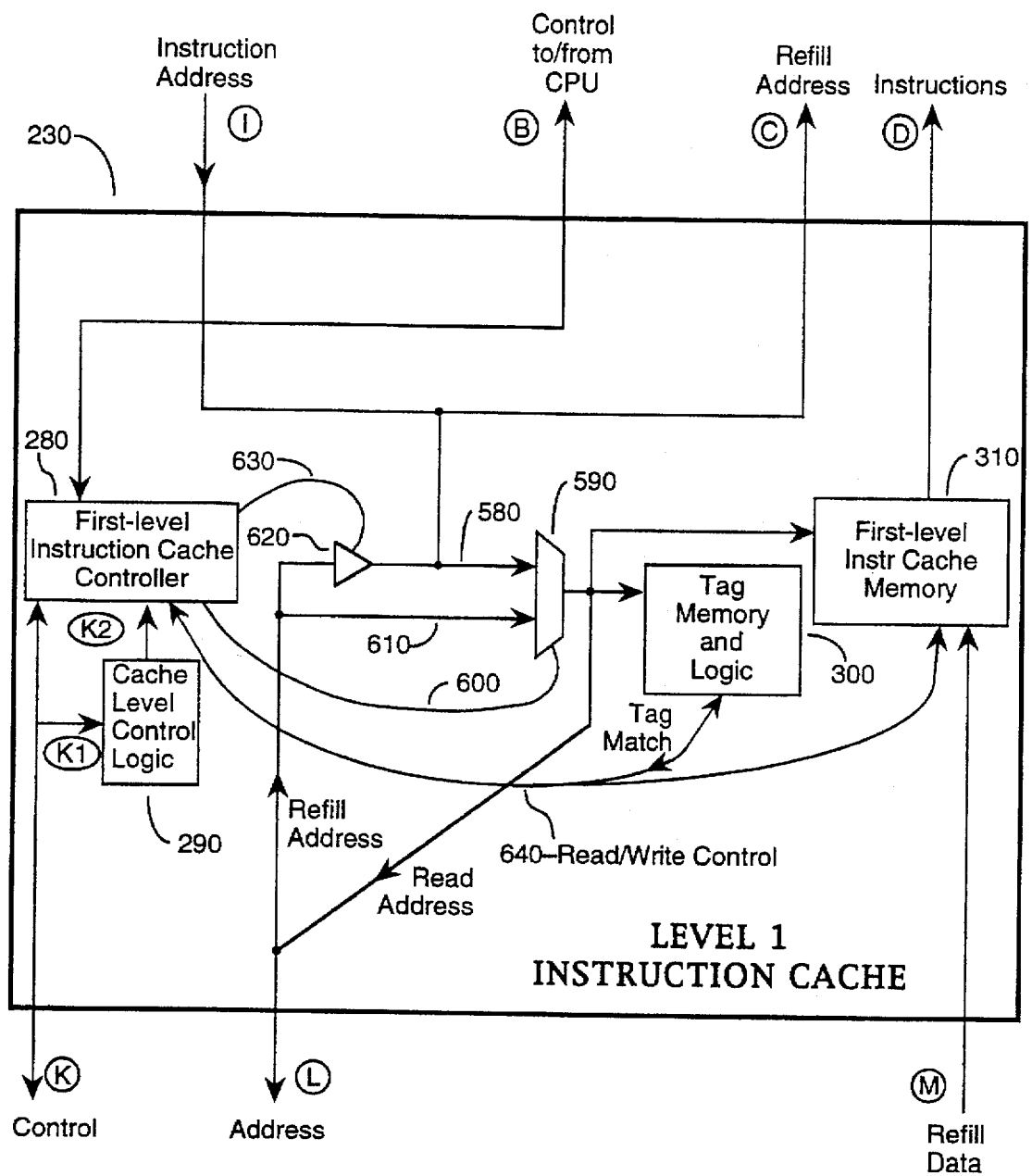
FIG. 3 is a block diagram of the instruction cache shown in FIG. 2.
Figure 4:
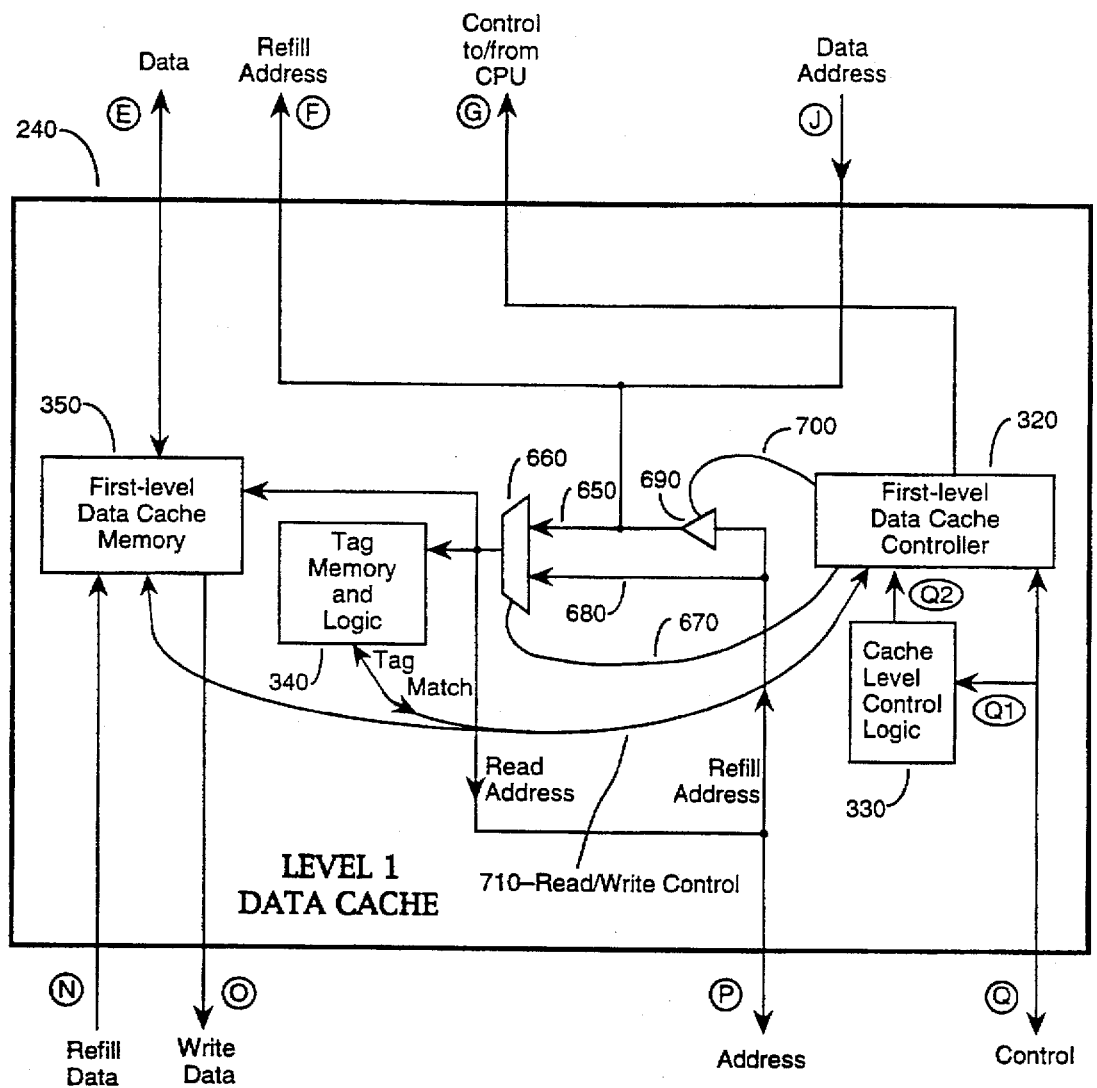
FIG. 4 is a block diagram of the data cache shown in FIG. 2.

FIG. 3 is a detailed block diagram of the instruction cache 230, which includes an instruction cache controller 280; cache level control logic 290; tag memory and logic 300; and a data memory array (or cache memory) 310. FIG. 4 is a detailed block diagram of the data cache 240, which includes a data cache controller 320; cache level control logic 330; tag memory and logic 340; and a data memory array (or cache memory) 350. The instruction cache 230 and data cache 240 are of substantially identical design, except that no capability is provided in the instruction cache for writing to the cache memory 310, because an executing program will not be called upon to write its own instructions; they are read-only.

Figure 5:
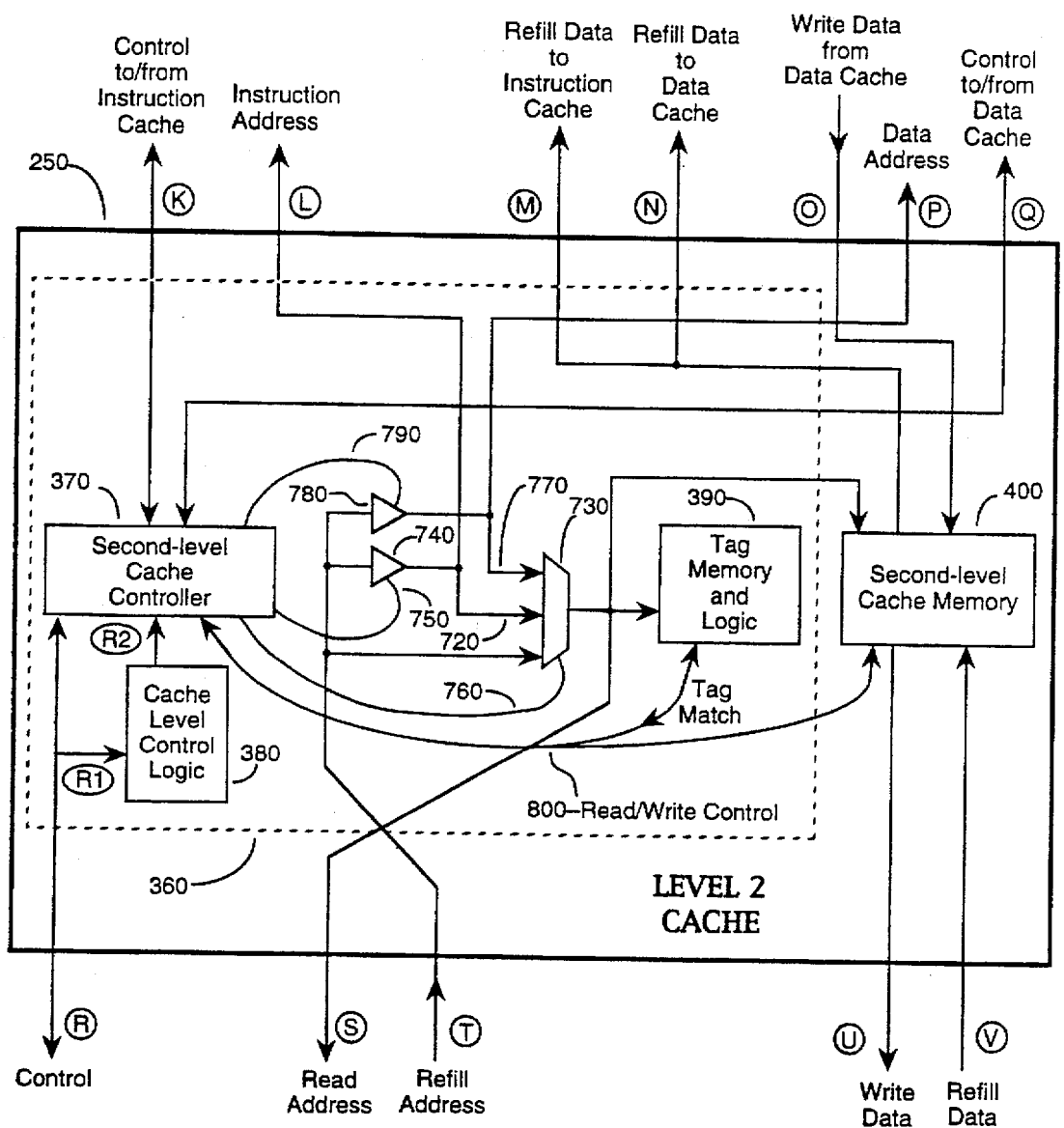
FIG. 5 is a detailed block diagram of cache level 2 shown in FIG. 2.
Figure 6:
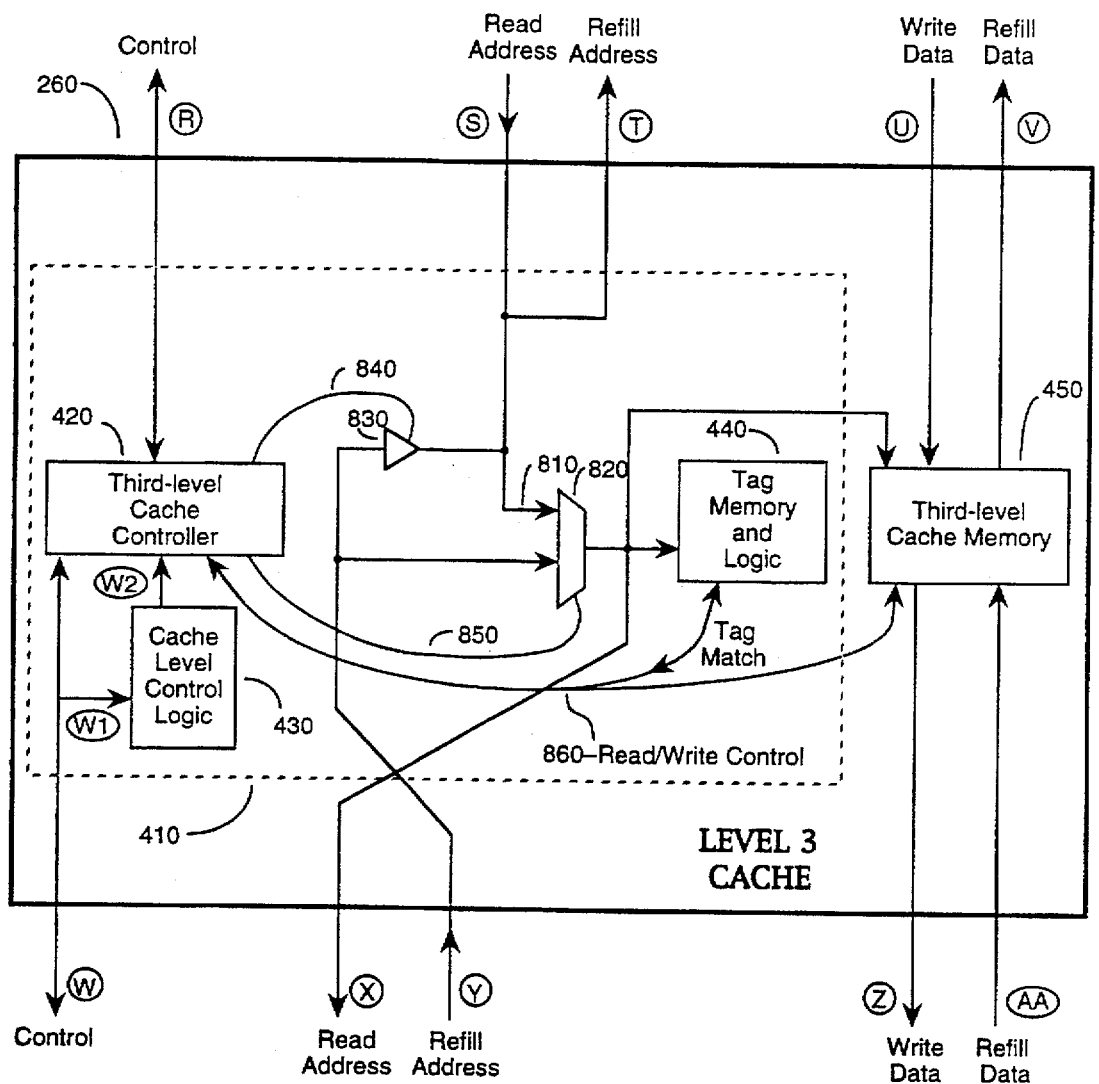
FIG. 6 is a detailed block diagram of cache level 3 shown in FIG. 2.

FIG. 5 is a block diagram showing detail of the level 2 cache 250 shown in FIG. 2, which includes: (1) second-level cache logic/tags 360, comprising a cache controller 370, cache level control logic 380, and tag memory and logic 390; and (2) a second-level cache memory 400. FIG. 6 is a similarly detailed block diagram of the level 3 cache 260 shown in FIG. 2, which includes: (1) third-level cache logic/tags 410, comprising a cache controller 420, cache level control logic 430, and tag memory and logic 440; and (2) a third-level cache memory 450.

The cache memories 400 and 450 are of conventional design, and may use one of several standard mapping procedures, such as direct mapping or associative mapping. The tag memories/logic 390 and 440 are likewise of a conventional design. Background on cache designs may be found in Smith, A. J., "Cache Memories", *Computing Surveys*, Vol. 14, No. 3 (September 1982); and on multilevel caching and tag memories in particular in U.S. Pat. No. 5,136,700 to Thacker, "Apparatus and Method for Reducing Interference in Two-Level Cache Memories"; both of which publications are incorporated herein by reference.

Each of the cache memories 310, 350, 400 and 450 is a random access memory, preferably SRAM, which is notably faster than DRAM. The level 1 instruction and data cache memories 310 and 350 are preferably 4 kilobytes (KB) in size. The size of each successive cache level memories increases with proximity to the processor; thus, cache memory 400 is preferably 64 KB, and cache memory 450 of level 3—the largest cache memory in this embodiment—is preferably 16 megabytes (MB). The main memory 270 has yet greater capacity than the third level cache memory 450, and will typically be several to many times the size of cache memory 450. Memories of other sizes may be used, the important factor for caching efficiency being that each cache memory is larger than that of the next cache level up in the hierarchy.

The access speed for an SRAM device is inversely related to its size; thus, the smallest cache memories, namely the instruction and data caches, are the fastest, and the largest cache memory (that of level 3) is the slowest of the cache memories. The DRAM main memory 270 has an access speed which is still slower. Commercially available conventional SRAM and DRAM are suitable for these memories.

Data access requests may be either read (load) requests or write (store) requests, and cacheability control is important for both procedures. These are considered in turn below.

Data loading with cache level selection

The method of the invention for selective caching upon a data load request by the CPU is represented by the flow chart of FIG. 7, which will be described briefly, followed by a detailed description of the method as it is carried out by the system shown in FIGS. 2–6.

Figure 7:
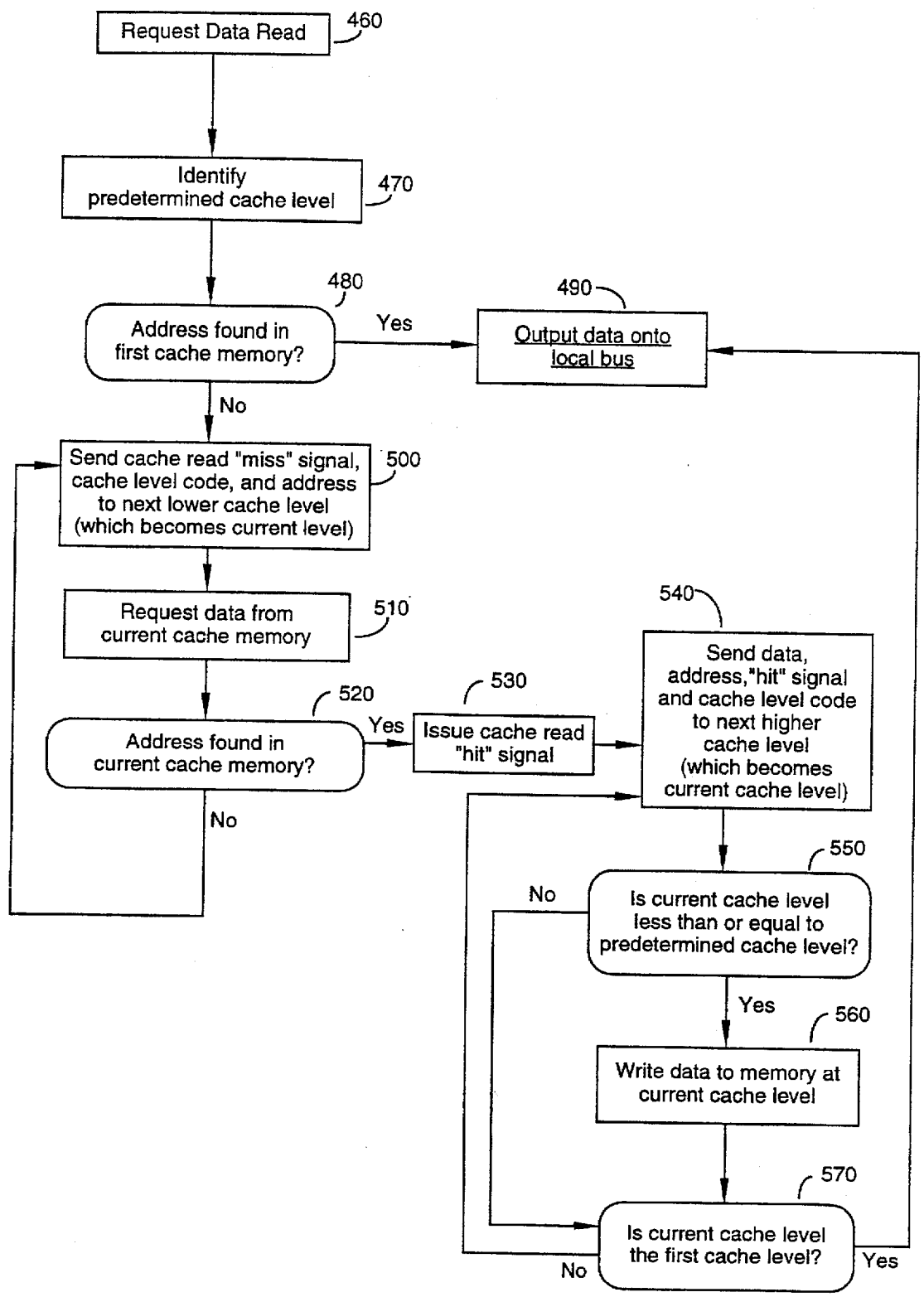
FIG. 7 is a flow chart of a method of treating a read request in a multilevel cache system of the invention.

In FIG. 7, box 460 represents the issuance of a data request by the CPU 190. "Data" in this case may mean either instruction data (generally referred to herein simply as "instructions") or non-instruction data. The distinction is important only at cache level 1, which treats instructions and other data differently; levels 2 and 3 do not distinguish between instructions and other data.

The data request at box 460 is followed by identification, at box 470, of the highest cache level to which the data may be written once it is retrieved. One method for making and implementing the selection of the cache level is described below in connection with FIGS. 8–19, and involves generating a cache level code to be correlated with each data request, identifying the selected caching level.

If the address of the requested data is found at the first level, i.e. in the instruction cache 230 or the data cache 240 shown in FIG. 2, decision box 480 branches to box 490, and the retrieved data is output on the data bus (D or E in FIG. 2) to the CPU 190. Otherwise, a cache read "miss" signal is issued at box 500 and is sent with the cache level code and the address of the requested data to the next level down. The data is thus requested at the next level down (box 510), which will be level 2. As long as the data is not found at each succeeding lower level, decision box 520 causes a recursion of the search beginning at box 500.

Once the data is found, a cache read "hit" signal is issued at box 530, and is sent along with the data, its address, and its cache level code back up to the next higher cache level, which becomes the current cache level. At decision box 550, the system determines whether that level is the same as or lower than the highest cache level to which the data is allowed to be written. If so, the data is written to the current cache level, at box 560, and the system determines at decision box 570 whether the current cache level is the first cache level, i.e. the level adjacent the CPU. If not, the procedure of boxes 540–570 is repeated, until the data reaches the first cache level, with a decision being made at each level whether the data may be written at that level or is merely passed through to the next higher level.

Eventually, the data makes its way to cache level 1, at which point decision box 570 branches to box 490, and the data is output to the CPU on the local data bus.

Using the system of FIGS. 2–6, there are several ways to select the highest cache level to which a given block of data is allowed to be written. For example, the highest-order bits in the virtual address of the requested data may include a cache level control code determining the selected cache level. State-of-the-art systems today typically use 64-bit addressing, which at present leaves many higher-order bits unused. Thus, bits 63 and 62 (the two highest-order bits in a 64-bit address), for example, may be assigned values which correspond to the cache levels, as given in the following table:

TABLE 1

| Control Code | Cacheability |
|---|---|
| 00 | Level 1 and below |
| 01 | Level 2 and below |
| 10 | Level 3 and below |
| 11 | Main memory only (uncached) |

The address configurations resulting from this assignment of bits are shown in FIGS. 8–11, with only the leading two bits in each case being relevant here. Thus, the 0's and 1's appearing at bits (6) through (0) in FIGS. 8–11 represent the least significant bits in some address from which data is requested by the CPU. This address may include any of the cache level codes, as represented by the 00, 01, 10 and 11 appearing in bits (63) and (62) in FIGS. 8, 9, 10 and 11, respectively.

Thus, if control code 00 is used for a given block of requested data, it will be cached at all levels upon retrieval, here levels 1, 2 and 3. If code 01 is specified for the requested data, it will be cached at levels 2 and 3, and code 10 will cause it to be cached only at level 3. If code 11 is specified for the data, it will not be cached at all. One code is correlated with each data request and is passed to each of the cache levels on the respective control buses, as will be clear from the discussion below.

Assuming for the moment that a request to read an instruction has been made by the CPU 190, the virtual address of the requested block of data is sent over instruction virtual address bus A to the instruction TLB 200. Because only instructions are needed by the CPU 190, the data TLB 210 and data cache 240 are not accessed at this point.

The TLB 200 maps the virtual address onto a real address in a conventional manner, and extracts the code for the selected caching level. The real address is passed over instruction real address bus I to the instruction cache 230. The coding bits are stripped from the virtual address and placed on control bus B to be passed along with the read request to the instruction cache 230, specifically to the cache controller 280 shown in FIG. 3.

The real address of the requested block of data is provided over to an input bus 580 of a multiplexer (MUX) 590. The multiplexer 590 has a second input 610, which is a refill address input on bus L from the next lower level in the hierarchy. Address refilling does not occur at this point, and will be discussed below.

A MUX select line 600 from the cache controller 280 selects the input bus 580, since this is a read request from the CPU. Also connected to the input bus 580 is a switch-enabled buffer 620 controlled by an enable/disable 630 line and having as its input the refill address provided over bus L. Because this is a read operation and not a refill operation, the enable/disable 630 line disables the buffer 620, and only the instruction address arriving over bus I reaches the multiplexer 590.

The instruction address is thus provided by the multiplexer 590 to tag memory and logic 300 and to the instruction cache memory 310. A read control is also provided to the tag memory/logic 300, over bus 640 from the cache controller 280.

If the instruction address is located by the tag memory/logic 300, this means that the desired instruction is in the cache memory 310, and a tag match signal is sent back to the cache controller 280 over bus 640. The controller 280 then sends a read control to the cache memory 310, which consequently reads out the requested instruction from the address provided by the multiplexer 590, and outputs the instruction on bus D to the CPU. The instruction address which was input on bus I meanwhile appears on refill address bus C, and is thus passed back to the CPU along with the instruction. A "hit" signal is sent to the CPU by the instruction cache controller 280 over the control bus B.

If the instruction address does not generate a match by the tag memory/logic 300, the instruction request must be passed to the next lower level of the caching system, and thus a "miss" signal is output along with the cache level code onto control bus K by the cache controller 280. The output of the multiplexer 590 is connected to the address bus L, and thus the address for the requested instruction appears on that bus. Buses K and L are connected to the level 2 cache as shown in FIGS. 2 and 5.

If the CPU makes a request for non-instruction data, a corresponding procedure is executed in the level 1 data cache. The data address from the data TLB 210 is provided via address bus J to an input bus 650 of multiplexer 660, as well as to refill address bus F. The multiplexer is controlled via a select line 670 by the data cache controller 320, and has a second input bus 680 connected to address bus P for providing refill addresses from lower levels. The cache controller 320 disables a switch-enabled buffer 690 via an enable/disable line 700, to select for the address appearing on bus J. With the multiplexer 660 selecting input 650, this address is provided to the tag memory and logic 340, which may be identical to the tag memory/logic 300, and provides a match signal to the cache controller 320 via bus 710, which in turn sends a read command to the cache memory 350. The memory 350 outputs the located data to the CPU 190 over data bus E, along with the address of the data over refill address bus F. A "hit" signal is sent by the data cache controller 320 over the control bus G.

If the data is not found at level 1, a miss signal is generated and is sent by the data cache controller 320, along with the cache level code, over bus Q to the second-level cache controller 370, as shown in FIGS. 2 and 5. The controller 370 may thus receive a miss signal from either the instruction cache 230 or the data cache 240, the miss signal acting as a read request at the second level.

For an instruction request, the instruction address on bus L is provided as input on input bus 720 of multiplexer 730. A switch-enabled buffer 740 is disabled via enable/disable line 750 by the second-level cache controller 370 to block refill address bus T from cache level 3. The cache controller 370 sends a signal over select line 760 to multiplexer 730, causing it to select the instruction address appearing at its input.

Alternatively, for a (non-instruction) data request, the data address on bus P is provided on input bus 770 of the multiplexer 730, and switch-enabled buffer 780 is disabled via enable/disable line 790 by the cache controller 370. In this case, the controller 370 causes the multiplexer 730 to select the data address on input 770.

The instruction address or non-instruction data address, as the case may be, is thus provided as input to the tag memory and logic 390, which operates in the same manner as the tag memory/logic 300 and 340 to provide a match signal over bus 800 to the cache controller if the requested address is found. In this case, the retrieved instruction or data is placed by the second-level cache memory onto the refill data buses M and N, and a "hit" signal is sent to the level 1 instruction or data cache on the control bus K or control bus Q, respectively.

If the data request cannot be fulfilled at level 2, a "miss" signal is generated by the second-level cache controller 370 and is sent over control bus R to the third-level cache controller 420 shown in FIGS. 2 and 6.

The address of the requested data is provided on read address bus S, and appears on input bus 810 of multiplexer 820. Refill address bus Y from the main memory 270 is also coupled to the input bus 810, but at this point is disabled by means of switch-enabled buffer 830, controlled via enable/disable line 840 by the cache controller 420.

The multiplexer 820 selects, via select line 850, input 810, and thus the address on bus S is passed through to tag memory and logic 440, which also receives a read signal from the cache controller 420 via read/write control bus 860. If a match is found, the third-level cache memory 450 reads out the data at the address provided from the output of the multiplexer 820. The data is output to level 2 over refill data bus V, and a "hit" signal is output to level 2 over the control bus R.

If the data is not found, then the cache controller 420 sends a "miss" signal and the cache level code over control bus W to the main memory 270, while the address of the requested data is provided over bus X. The main memory reads out the requested data in a conventional manner, and places it on refill data bus AA while outputting the address on refill address bus Y. A "hit" signal is generated by logic in the main memory 270 and placed on control bus W, along with the cache level code.

The data now begins to make its way back up the caching hierarchy. The cache controller 420 at this point selects the bus Y as the input to the multiplexer 820, thereby allowing the refill address to be input to the tag memory/logic 440 and the cache memory 450 for a write operation to the third-level cache memory 450. In addition, the cache controller 420 enables the buffer 830 via the line 840, so that the address from refill address bus Y passes through to refill address bus T.

The "hit" signal on bus W is input to the cache controller 420. Assuming for this example that the requested data is preselected for caching up to level 2, and that the coding scheme discussed above is used, then bits 63 and 62 of the virtual address for the requested data are 0 and 1, respectively. The code stripped from the virtual address by the TLB 200 or TLB 210 may, then, simply be this "01".

The cache level code is input over bus W1 to the cache level control logic 430, and the output of control logic 430 is input via bus W2 to the cache controller 420. Logic 430 includes a NAND gate 870 having as inputs lines 63 and 62 (representing bits 63 and 62, respectively, in the original virtual address), which in this example carry a "0" and a "1", respectively. A truth table for this gate is as follows:

TABLE 2

| Control Code | Logic 430 Output |
| --- | --- |
| 00 | 1 |
| 01 | 1 |
| 10 | 1 |
| 11 | 0 |

Thus, for control code 01, the output of logic 430 will be 1, which is input to the cache controller 420 and enables it to write via read/write control bus 860 to the third-level cache memory 450. This is the appropriate result, because the desired highest caching level is level 2.

In fact, the above truth table shows that the logic 430 will output a "1" and thus enable a write to the third-level cache memory 450 whenever any of the codes 00, 01 or 10 is presented to its input, but not when the code 11 is presented. This results in writing the retrieved data to third-level cache memory 450 whenever the first, second or third cache level is designated by the control code, but not when the main memory (uncached) designation is used.

After writing the data at the third level, the cache controller 420 passes a "hit" signal via bus R to the second-level cache controller 370, along with the cache level code, which is input to the cache level control logic 380 via bus R1. The output of logic 380 appears on bus R2 as input to the second-level cache controller 370.

The retrieved data is meanwhile presented via the refill data bus V to the second-level cache memory 400, and the address of the data is presented via the refill address bus T.

At this time, the cache controller 370, having received the "hit" signal, sends a signal over line 760 to select the bus T as the input of the multiplexer 730, causing the refill address to be presented to the tag memory/logic 390 and second-level cache memory 400. In addition, the controller 370 enables either buffer 740 or buffer 780, depending on whether the retrieved data is an instruction or non-instruction data, thereby passing the data to either instruction address bus L or data address bus P, respectively. The identification of the data as an instruction or not may be made by a data-type code passed down and up the control buses in parallel with the data itself.

Figure 13:
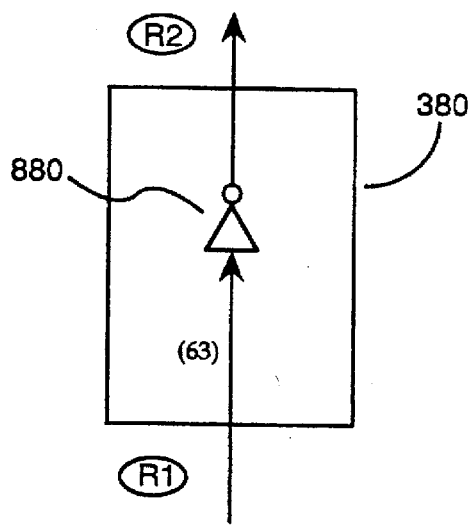

Control logic 380 determines whether the data being passed through shall be written to the second-level cache memory, and is depicted in FIG. 13. It includes an inverter 880 having as its sole input the first bit in the control code, i.e. the bit corresponding to bit 63 in the original virtual address. Following is a truth table for the output of logic 380:

TABLE 3

| Control Code | Logic 380 Output |
|---|---|
| 00 | 1 |
| 01 | 1 |
| 10 | 0 |
| 11 | 0 |

Thus, for an input of 01 the corresponding output of logic 880 (and hence 380) will be 1, which is input as an enable signal to the second-level cache controller 370. The controller 370 is thereby enabled to write the data on refill data bus V to the second-level cache memory 400, and to update the tag memory/logic 390 accordingly. For inputs of 10 or 11, the logic 380 yields a 0, thus preventing overwriting of data at cache level 2.

If the data is not instruction data, it is input via refill data bus N to the first-level data cache memory 350. As shown in FIG. 5, the data may actually appear on both the instruction and non-instruction refill data buses M and N, respectively; what determines whether the data is written to the instruction cache 230 or the data cache 240 is the data-type code provided on the control buses K and Q.

The address for the data is also input via address bus P to the data cache 240, and is provided via the multiplexer input 680 and the multiplexer 660, under the control of the data cache controller 320, to the tag memory/logic 340 and the first-level data cache memory 350. It is also provided via the switch-enabled buffer 690 to the refill address bus F.

Figure 12:
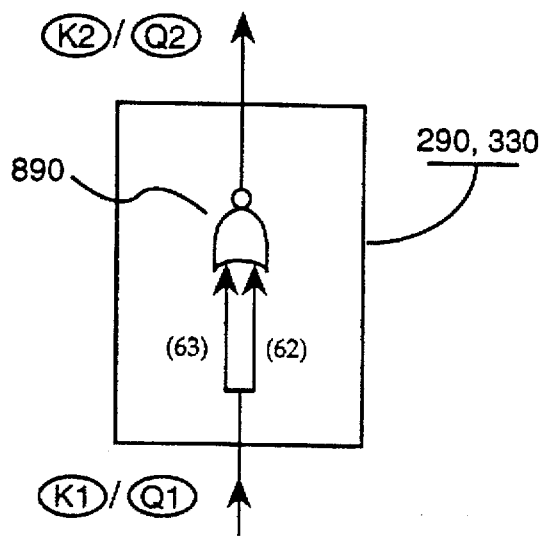
FIGS. 12–14 are partial block diagrams showing exemplary logic gates used in implementing the cache level control.
Figure 14:
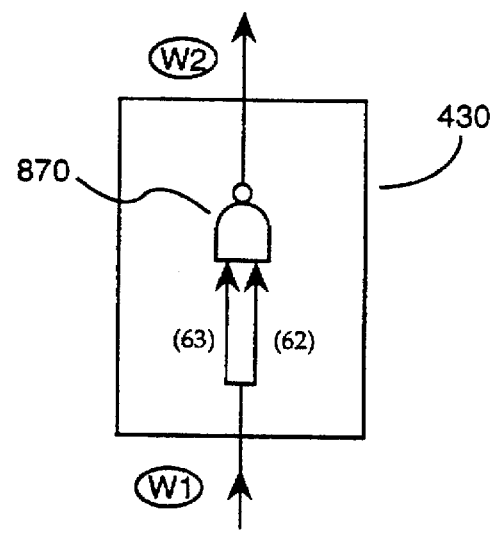

The cache level code appears via bus Q1 at the input of the cache level control logic 330, depicted in FIG. 12. Logic 330 includes a NOR gate 890, to which the two bits of the cache level code are input. The output of logic 330 is provided over bus Q2 to the data cache controller 320, as shown in FIG. 4. Following is a truth table for the output on bus Q2 versus its input at bus Q1:

TABLE 4

| Control Code | Logic 290, 330 Output |
|---|---|
| 00 | 1 |
| 01 | 0 |
| 10 | 0 |
| 11 | 0 |

Thus, for an input of 01 the corresponding output of logic 330 will be 0, which is correct because the data was designated in this example for writing no higher than cache level 2. Logic 330 accordingly acts as to protect the cache memory 350 from being overwritten by data which is not wanted at the first cache level.

The data is finally output to the CPU 190 over the data bus E, along with a "hit" signal over control bus G and the corresponding address over refill address bus F.

If instruction data was retrieved, the instruction cache is instead utilized in the above manner. In this case, the cache level code is presented via bus K1 to the cache level control logic 290, and the output of the logic 290 appears on bus K2 as input to the instruction cache controller 280, as shown in FIG. 3. The control logic 290 is identical to control logic 330, acting as instruction overwrite protection, and as shown in Table 4 above will give identical results for a given cache level code. In either case, in the present example the data is not written at level 1 but is merely passed through to the CPU 190.

No matter at which level the data is found, it can never be written to a cache level higher than the designated level. Thus, if the data in the above example were located in the level 3 cache memory, it would be passed up to level 2 and written there, and then passed without writing through level 1 to the CPU. If the data were located in cache level 2, it would merely be retrieved and passed up through level 1 to the CPU without writing to any cache level, since it was already present in level 2 and is not authorized for writing at level 1.

If a cache level code of "11" is associated with the requested data, then as Tables 2–4 above show, the data would not be written above the main memory level. The particular values of the cache codes are not important; any values may be used, and the cache level select logic for each level is then designed to respond as desired to the selected values.

It is not necessary to use control logic at the level of the main memory, since reads from main memory do not result in a write at that level, and all write commands ultimately result in a write to main memory.

Data writing with cache level selection

If instead of a read request the CPU issues a write (i.e. store data) request, the behavior of the system depends upon: (1) whether a write-through or write-back caching policy is used; and (2) whether the system uses a write-allocate policy. The cache control code is also used in the write procedure.

Figure 17:
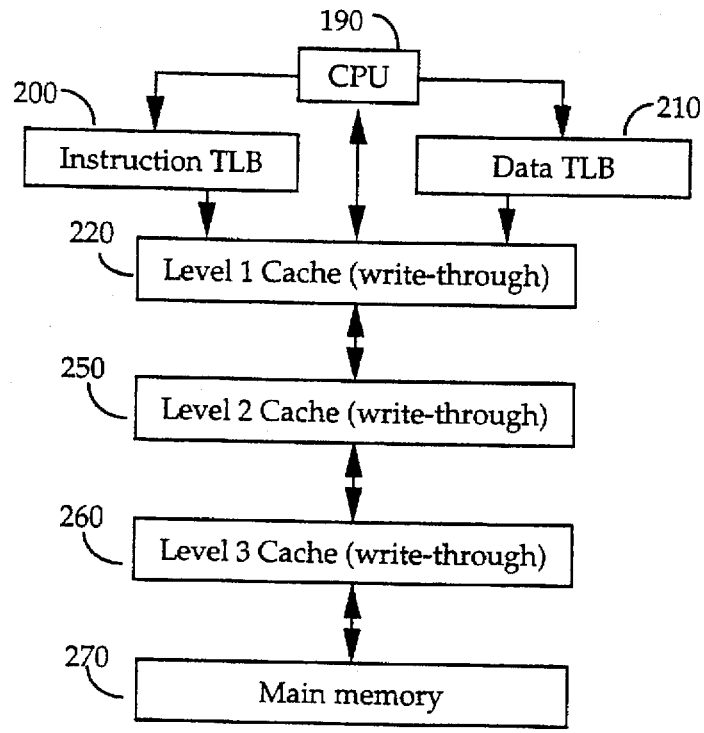
FIGS. 17–19 are block diagrams showing various assignments of write-through and write-back policies in a multilevel cache system of the invention.
Figure 18:
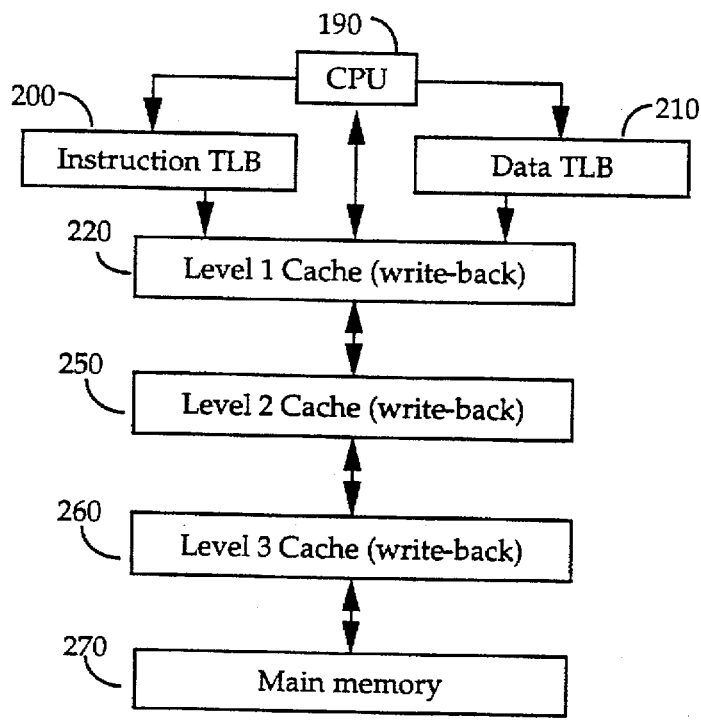
Figure 19:
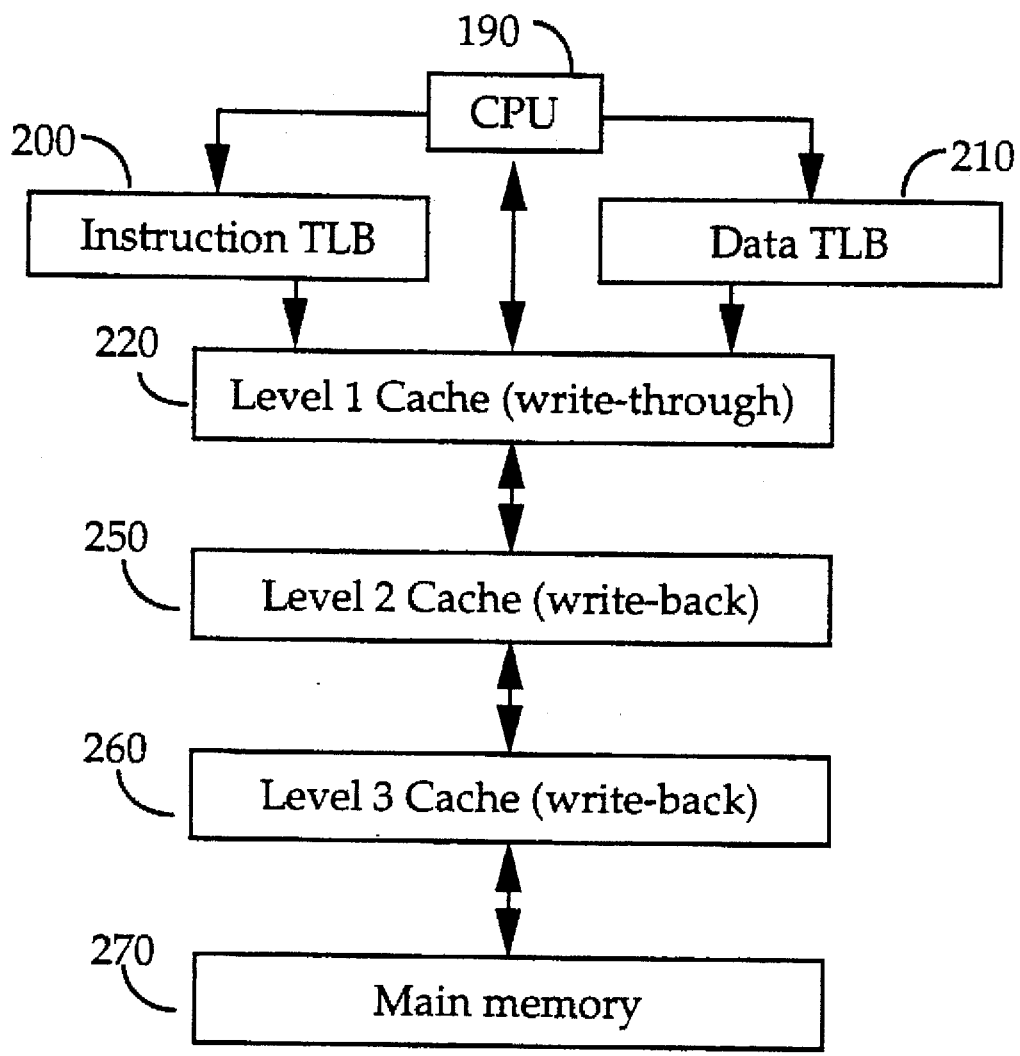

Write-through and write-back policies are conventional procedures used in cache memory systems for determining when and where in the cache memory new data is written when a write request is executed. In a multilevel cache system, there are three typical possibilities: that all the cache levels are designated as write-through; that all the cache levels are designated as write-back; or that the top cache level is designated as write-through, while the lower cache levels are designated as write-back. The third possibility has other variations, but generally there will be a group of one or more write-through cache levels at the top of the hierarchy, and any lower cache levels will be write-back. FIGS. 17–19 show the three described configurations.

Upon a write request, the data to be written will in general have a value different from an earlier value for the same data, but of course the real address of that data remains unaltered. Thus, if the address for the new data value is found in the first level cache memory, this means that an older value for that data is stored in the first level cache memory, and the new value is therefore written over the old value. In this case, a "hit" signal is issued by the first level cache. Any cache level immediately below a level which is designated as write-through also has the new data written to it at this point. Thus, in the configuration of FIG. 17, all cache levels and the main memory would at this point have the new data written to them.

In the purely write-back system of FIG. 18, the first level where a "hit" is generated is written to. The other levels (which are all designated as write-back) do not in general have the new data written to them until the cache line containing the new data (such as the cache line in cache level 1 to which the new data has been written) is written over by different information. Thus, if at some later time a new variable's value is to be written over the line of the level one cache memory containing the new data in the above example, then that new data is written into the next lower cache level, or into the main memory if there is no next lower cache level. This saves the steps of writing all the way down to main memory every time a variable's value changes. In the configuration of FIG. 18, the act of writing to memory is always delayed in this manner, since all cache levels are designated as write-back.

In the combined configuration of FIG. 19, cache level 1 is treated as write-through (which means that cache level 2 is written to if a "hit" is generated at level 1), and the other levels are treated as write-back.

Write-allocate policy is similar to write-through, except that it is used to determine how far up in the hierarchy a new data value will be written when it is written to the main memory or a given cache level. In conventional systems, the use of a write-allocate procedure means that a new data value, upon being written at a given level, is written immediately to all levels above that level which are designated as write-allocate. The determination of whether a given level is write-allocate or not is conventionally determined by the circuitry of the cache system, and is thus not variable for a given system.

The present system expands upon this by using the cache control bits (or other higher-order bits in the address, as in FIGS. 8–11) to control whether a given item of data is write-allocate or not. Thus, whether or not to use the write-allocate procedure can be determined on a reference-by-reference basis; moreover, as with the read requests discussed above, the same data may be differently designated at different times in the execution of the program.

If a control code is used for selecting write allocation which is different from the cache level code used for the previously described read procedure, then data caching on a read request may be controlled independently from caching on a write request, for each item of data. For example, bits 63 and 62 (see FIGS. 8–11) might be used for the read-request cache control code, while bits 61 and 60 are used for the write-request cache control code.

In the system of FIG. 18, for data which is not designated as write-allocate, a new data value will be written only at the first level which generates a hit. If that level happens to be the main memory (i.e. a "miss" is generated by all cache levels), the cacheability for that data is effectively set to main memory, with the no-write-allocate policy effectively overriding the cacheability code.

Figure 15:
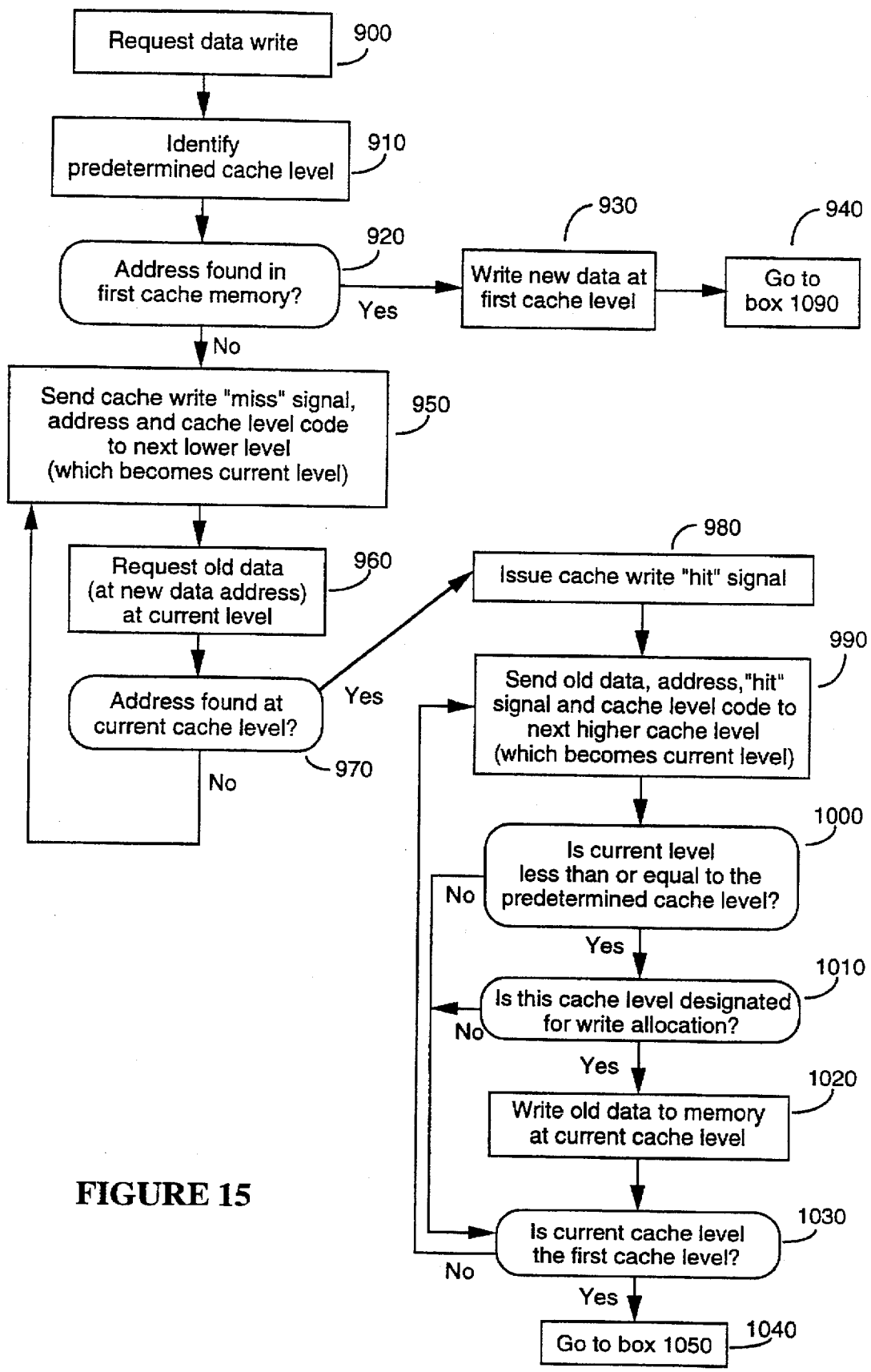
FIGS. 15–16 are flow charts of a method of treating a write request in a multilevel cache system of the invention.
Figure 16:
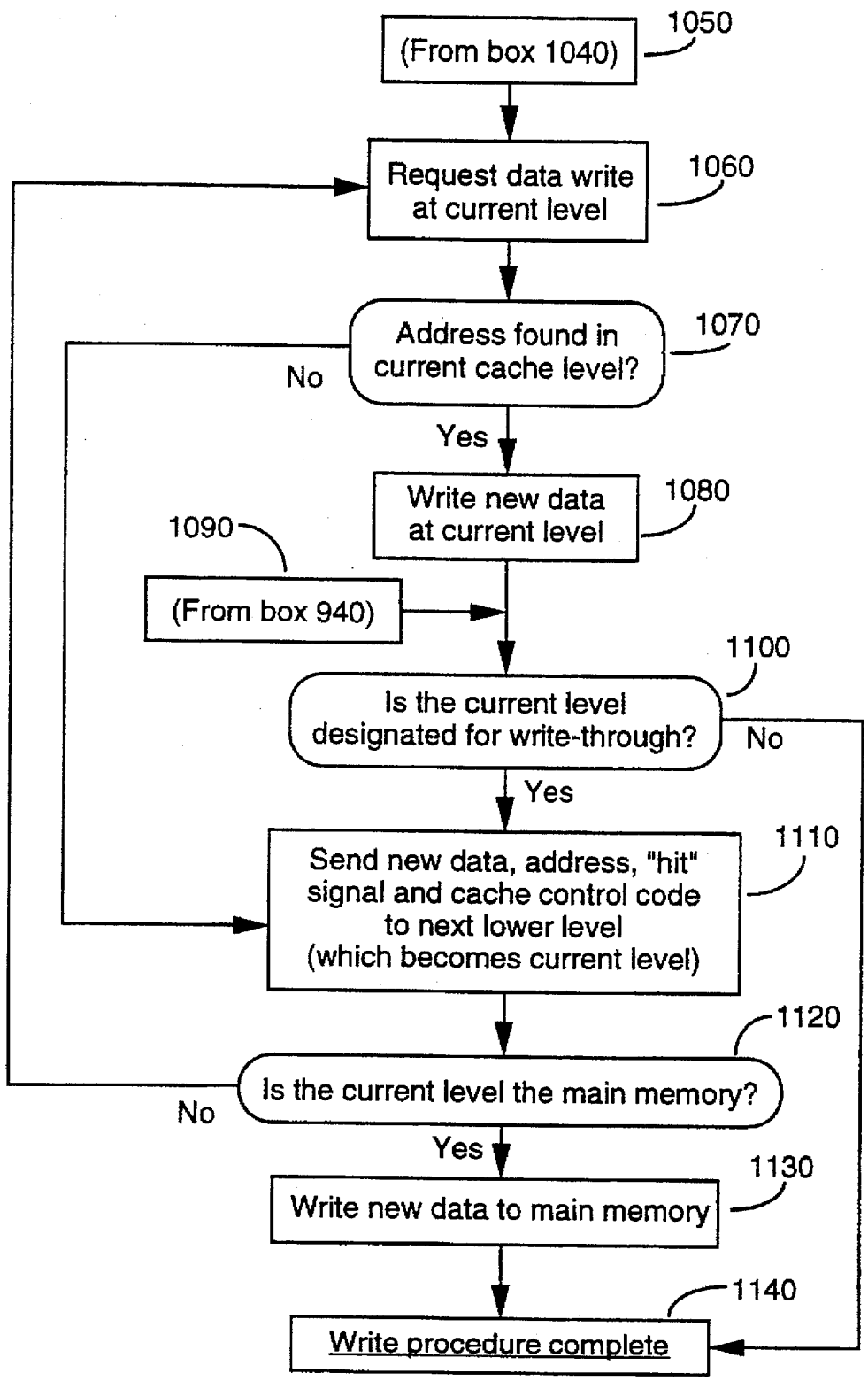

The procedural steps shown in FIGS. 15 and 16 for implementing a write request are implemented in hardware in essentially the same manner as the read requests discussed above relative to FIGS. 2–14; thus, the data write request, cache level code, data write "hit" and "miss" signals, data address and other signals are passed from level to level in the apparatus of FIG. 2 in the same manner as the corresponding signals in a read request.

When a write request is issued by the CPU, as in box 900, the data to be written is passed via bus E in FIGS. 2 and 4 to the first-level data cache memory 350. The predetermined cache level is determined in box 910. The data address is sent to the tag memory/logic 340, and at decision box 920 it is determined whether the address of the data to be written is already in the first cache memory. If so, the new value of the data is written over the old value, as at box 930. At box 940 the procedure then branches to box 1090 of FIG. 16, to be discussed below.

If the address for the new data is not found in the first cache memory, then a cache write "miss" signal is issued, and is sent over control bus Q to the second-level cache controller 370 shown in FIG. 5. At the same time, at box 950, the data address is sent over address bus P to the tag memory/logic 390, and the cache level code is likewise sent to the level 2 cache 250. The cache write "miss" signal acts as a request for the old data at the current level as reflected at box 960. If the old data (i.e. the new data address) is not found, then at decision box 970 the procedure branches back to box 950, whereupon the "miss" signal, address and cache level code are sent to the next level down, namely level three, and then on the main memory if the data's address is not found at level three.

Once an older value of the data is found (which will occur at the main memory if the data has not previously been cached or has been overwritten in the cache memories), the procedure branches to box 980, and a cache write "hit" signal is generated. This is sent along with the old data value, the address and the cache level code to the next higher cache level, as indicated in box 990. At decision box 1000, if the current level is still at or lower than the predetermined cache level, then it is determined at decision box 1010 whether this cache level is designated for write allocation. If it is, then at box 1020 the old data is written to memory at the current cache level; otherwise, the procedure branches to decision box 1030. If the current cache level is not the first cache level, a loop back to box 990 is executed and the loop is repeated until the first cache level is reached, and the method proceeds then to boxes 1040 and 1050.

The procedure of FIG. 15 thus uses the address of new data which is to be written to memory, and searches for the address of that data in the memory hierarchy. If the address is found, the older value of the data is written at a set of cache levels including each level between the level at which it was found and the predetermined cache level, if the latter is higher than the former. By the time box 1040 is reached, then, the old data and its address appear in each of this set of cache levels, which sets the system up for the write procedure of FIG. 16. The portion of FIG. 15 including boxes 980–1040 tests each level for whether it is write-allocate or not, and even if it is write-allocate skips the level if it is higher than the level allowed by the cache control code; both conditions (boxes 1000 and 1010) must be met for data allocation to occur at a given level.

At box 1060, a write request is issued for the current level, which at the first pass (coming from box 1050) is the first cache level. If the address of the (new) data is found at the current level, at decision box 1070, then at box 1080 the new data is written at that level. This is the point at which the procedure branches in from box 940. At decision box 1100, it is determined whether the current level is designated for write-through. If so, then at box 1110 the new data, the address, the "hit" signal and the cache control code are sent to the next lower level. If that next level is not the main memory, then at decision box 1120 the procedure loops back to box 1060, and the loop repeats until either the current level is no longer designated for write-through (box 1100) or the main memory is reached (box 1120). In the latter case, the new data is then written to main memory, and in either case the procedure is then complete at box 1140.

With the foregoing method, the cache control code can be used as a data-by-data control over whether each data item is designated as write-allocate. It also acts as a reference-by-reference control, since for each reference to a given data item during program execution, the control code may be selected anew. Moreover, by using different bits in the address or in general a different cache control code assignment for read requests vis-a-vis write requests, cacheability on read and write requests may be made independently of one another.

Variable cache level Coding

The present system not only allows multiple-level selective caching, but a given variable may be cached to different levels at different points in the execution of a program, to further increase the efficient use of memory. In the example of gaussian elimination discussed above, it was necessary to use, for example, the first row repeatedly in connection with all of the other rows of the matrix. It is sensible, then, to cache the first row in the first level data cache, and limit the large matrix to caching at level 3. Later in the procedure, a new pivot row may be cached at level 1, and the remainder of the matrix at level 3. The data of the different pivot rows must therefore have different cache level codes at different points in the operation, which can be accomplished by altering the (63, 62) bits in the virtual address when the data load is requested. The application can accomplish this without creating a data read error, since these two bits are not used to calculate the real address in any case.

Because of this variable cacheability, the latest version of a given block of data may be found either in the main memory or at any one of several different cache levels at different times. In order to ensure that a data request retrieves the most recent version of the data, it is important that the top-down retrieval procedure described above be followed.

Other coding options

Instead of including the cache level code into the virtual address, it may be encoded into the instruction opcode, with load and store operations being split up into many different types of instructions, according to the level of cacheability. Limitations to this implementation are that opcode encoding space is a limited resource, and that it would limit the levels of cacheability to a fixed number, depending upon the machine's instruction-set architecture. However, for certain applications it may be desirable.

Another way to control the level-specific cacheability is to store a control code with each TLB entry. This would be kept with other information stored in the TLB table, including the physical or real addresses and the access protection bits (such as fault-on-write, etc.). By mapping multiple virtual addresses through the TLB to the same physical address, any virtual address range can be used to select cacheability for a given level. This is an alternative way of achieving the variable cache level coding discussed above; to designate different caching levels for a given block of data at different times in the execution of a program, different virtual addresses are used to load or store that data, but the virtual addresses map to the same physical address so that the data is properly accessed in the main memory.

Still another way to implement the caching level control is to use a higher-order bit scheme as in the virtual address implementation discussed above, but in the physical addresses stored in the TLB. Addresses that are the same but for the two highest-order bits (such as bits 63, 62) would access the same portion of the main memory, but with different caching behavior. With each virtual address mapping to one physical address, the virtual address used for a given block of data at a given time will depend upon the level of caching desired at that time. Thus, to load data at one point a virtual address will be used which maps to a physical address having a "00" as the two highest bits, to cache the data at level 1; and to load the same data at a later point, a virtual address will be used which maps to a physical address having a "10" as the two highest bits, to cache the data at level 3. The same data is retrieved in either case, however, because the address space in the main memory corresponding to these two different physical addresses is nonetheless the same.

Cache level aggregating

Systems with fewer than the available number of caching levels can still utilize the generalized caching scheme discussed above by aggregating two or more levels together. In this way, an application expecting three cache levels, for instance, can run properly on a system having only two levels. For instance, a two-level system may treat levels 1 and 2 as used in a given application as a single level, such that whenever a cache level code designating either level 1 or level 2 is detected, the cache level control logic at level 1 will allow writing at that level. In this case, level 2 of the two-level system would be treated as level 3 in the generalized system, so whenever a level 3 code was utilized, the corresponding data would be written to level 2 in the two-level system but not to level 1.

Alternatively, such a two-level system may properly cache first- and second-level designated data at the first and second levels, and treat third-level designated data as uncached; or, it may cache second- and third-level designated data at level 2, and only first-level designated data at level 1. In each case, the two-level system is treating two of the levels of the three-level application as one, to subtract one caching level. By extension, any number of caching levels may be accommodated in an application, and systems with any number of actual cache levels may still operate with variable, level-selectable caching.

What is claimed is:

1. A memory system for coupling to a central processor, which issues a data request having a specified address to be accessed, the memory system comprising;

a main memory;

cache levels coupled between the main memory and the central processor in a multilevel hierarchy, each of the cache levels having a cache memory;

means, coupled to the processor, for identifying a cache level code associated with the data request, the cache level code indicating a hierarchical level in the multilevel hierarchy; and means for determining from the cache level code whether or not data associated with the specified address can be written to the cache memory at each of the cache levels.

2. The memory system of claim 1, wherein the means for determining includes cache logic at the particular cache level coupled to the cache memory at that particular cache level, the cache logic being responsive to the cache level code for determining whether data associated with the specified address may be written to the cache memory coupled to that cache logic.

3. A computer system, comprising:
a central processor for issuing a data request, the data request specifying a virtual address; and
a memory system, having a main memory and a plurality of cache levels coupled between the main memory and the central processor in a multilevel hierarchy, each of the cache levels having a cache memory, the memory system having means for identifying a cache level code from the virtual address and means for determining from the cache level code which cache memories can be written to with data associated with the specified virtual address and which cache memories cannot be written to with data associated with the specified virtual address.

4. A method for selectively caching data in a computer system having a central processor and a main memory, the method comprising the steps of:
coupling a plurality of cache levels in a multilevel hierarchy coupled between the main memory and the central processor, one of the cache levels being coupled to the central processor at a highest hierarchical level in the multilevel hierarchy, the main memory being at a lowest hierarchical level, each of the cache levels having a cache memory;
identifying a cache control code associated with a data write request issued by the central processor, the data write request having new data to be written over old data at a specified address;
issuing a miss signal and the specified address from a particular cache level to the next lower hierarchical level when the specified address is not stored in the cache memory at that particular cache level;
passing the old data, from a particular cache level that is at a lower hierarchical level that the highest hierarchical level, up to the next higher hierarchical level when the specified address is found in the cache memory at the particular cache level that is at a lower hierarchical level and a cache miss signal has issued from a next higher hierarchical level;
writing the old data to the cache memory at a particular cache level that received the old data from a lower hierarchical level when the particular cache level that received the old data is designated for write allocation as indicated by the cache control code.

5. The method of claim 4, further comprising:
writing the new data to the cache memory at a particular cache level when the old data is in the cache memory at that particular cache level and that particular cache level is either at the highest hierarchical level or at a hierarchical level above which each of the hierarchical levels is designated as a write-through cache level.

6. A memory system for coupling to a central processor, which issues a data request having a specified address to be accessed, the memory system comprising:
a main memory;
a plurality of cache levels coupled between the main memory and the central processor in a multilevel hierarchy, one of the cache levels being coupled to the central processor at a highest hierarchical level in the multilevel hierarchy, the main memory being at a lowest hierarchical level in the multilevel hierarchy, each of the cache levels having a cache memory;
means, coupled to the processor, for identifying a cache level code associated with the data request, the cache level code indicating a hierarchical level in the multilevel hierarchy; and means for determining from the cache level code which cache memories can be written to with data associated with the specified address and which cache memories cannot be written to with the data associated with the specified address.

7. The memory system of claim 6, wherein the means for determining includes cache logic at each of the cache levels, the cache logic at each of the cache levels being coupled to the cache memory at the same cache level as that cache logic, the cache logic at each of the cache levels being responsive to the cache level code for determining whether data associated with the specified address can be written to the cache memory coupled to that cache logic.

8. The memory system of claim 6 wherein the cache level code is included in the specified address of the data request.

9. The memory system of claim 6 wherein the data request includes an instruction opcode and the cache level code is encoded in the instruction opcode.

10. The memory system of claim 6 wherein the means for identifying includes a translation lookaside buffer (TLB) having entries for mapping virtual addresses generated by the central processor to physical addresses of the main memory, one of the entries mapping the specified address of the data request to a particular physical address of the main memory; and wherein the cache level code is included in the particular physical address.

11. The memory system of claim 6 wherein the means for identifying includes a translation lookaside buffer (TLB) having entries for mapping virtual addresses generated by the central processor to physical addresses of the main memory, a particular entry mapping the specified address of the data request to a particular physical address of the main memory; and wherein the cache level code is associated with the particular entry and stored in the TLB.

12. The memory system of claim 6, wherein
the means for determining determines that data associated with the specified address can be written to each of the cache memories that is at a cache level which is at or below the hierarchical level indicated by the cache level code.

13. The memory system as in claim 12, wherein the data request having the specified address is a data read request;
the means for determining finds the specified address at a hierarchical level in the multilevel hierarchy; and
the means for determining writes the data associated with the specified address to each of the cache memories that is at a cache level which is above the hierarchical level where the specified address was found and at or below the hierarchical level indicated by the cache level code.

14. The memory system as in claim 12, wherein the data request having the specified address is a data write request having new data to be written over old data at the specified address;
the means for determining includes cache logic at each of the cache levels, the cache logic at each of the cache levels being coupled to the cache memory at the same cache level as that cache logic;
the cache logic at each of the cache levels responds to the data write request by issuing a miss signal and the specified address to the next lower hierarchical level when the specified address is not stored in the cache memory to which that cache logic is coupled; and
the cache logic at each of the cache levels that is at a lower hierarchical level than the highest hierarchical level responds to the data write request by passing the old data up to the next higher hierarchical level when the specified address is found in the cache memory coupled to that cache logic and a miss signal has issued from the next higher hierarchical level.

15. The memory system of claim 14, wherein the cache logic at each of the cache levels writes the new data to the cache memory coupled to that cache logic if the old data is in that cache memory and that cache logic is at a cache level which is either at the highest hierarchical level or at a hierarchical level above which each of the hierarchical levels is designated as a write-through cache level.

16. The memory system as in claim 14, wherein the cache logic of a particular cache level receiving old data from a lower hierarchical level writes the old data to the cache memory coupled to that cache logic when that particular cache level is designated for write allocation and is at or below the hierarchical level indicated by the cache level code.

17. The memory system of claim 14, wherein the data write request includes a cache control code, the cache control code indicating whether each of the cache levels is designated for write-allocation.

18. A memory system coupled to a central processor, the central processor issuing a data write request having new data to be written over old data at a specified address, the memory system comprising;

a main memory;

a plurality of cache levels coupled between the main memory and the central processor in a multilevel hierarchy, one of the cache levels being coupled to the central processor at a highest hierarchical level in the multilevel hierarchy, the main memory being at a lowest hierarchical level, each of the cache levels having a cache memory; and means, responsive to the data write request and coupled to the central processor, for identifying a cache control code associated with the data write request, the cache control code indicating whether each of the cache levels is designated for write-allocation; and cache logic at each of the cache levels, the cache logic at each of the cache levels being coupled to the cache memory at the same cache level as that cache logic, the cache logic at each of the cache levels responding to the data write request by issuing a miss signal and the specified address to the next lower hierarchical level when the specified address is not stored in the cache memory to which that cache logic is coupled, the cache logic at a particular cache level that is at a lower hierarchical level than the highest hierarchical level responding to the data write request by passing the old data up to the next higher hierarchical level when the specified address is found in the cache memory coupled to that cache logic and a miss signal has issued from a next higher hierarchical level, the cache logic at a particular cache level that receives old data from a lower hierarchical level writing the old data to the cache memory coupled to that cache logic when the particular cache level that receives old data is designated for write allocation as indicated by the cache control code.

19. The memory system of claim 18, wherein the cache logic at a particular cache level writes the new data to the cache memory coupled to that cache logic when the old data is in that cache memory and that particular cache level is either at the highest hierarchical level or at a hierarchical level above which each of the hierarchical levels is designated as a write-through cache level.

20. The memory system of claim 18, wherein the cache control code indicates a hierarchical level in the multilevel hierarchy; and each of the cache levels that is at or below the hierarchical level indicated by the cache control code is designated for write allocation.

21. A method for selectively caching data in a computer system having a central processor and a main memory, the method comprising the steps of:

coupling a plurality of cache levels in a multilevel hierarchy between the central processor and the main memory, one of the cache levels being coupled to the central processor at a highest hierarchical level in the multilevel hierarchy, the main memory being at a lowest hierarchical level, each of the cache levels having a cache memory;

identifying a cache level code associated with a data request issued by the central processor, the cache level code indicating a hierarchical level in the multilevel hierarchy, the data request having a specified address; and determining from the cache level code which cache memories can be written to with data associated with the specified address and which cache memories cannot be written to with the data associated with the specified address.

22. The method of claim 21, wherein the step of determining includes the steps of:

permitting the data associated with the specified address to be written to each of the cache memories that is at a cache level which is at or below the hierarchical level indicated by the cache level code.

23. The method of claim 22, further comprising:

finding the specified address at one of the hierarchical levels in the multilevel hierarchy when the data request is a read request; and writing the data associated with the specified address to each of the cache memories that is at a cache level which is above the hierarchical level where the specified address was found and at or below the hierarchical level indicated by the cache level code.

24. The method of claim 22, wherein the data request having the specified address is a data write request having new data to write over old data at the specified address, and the method further comprises issuing a miss signal and the specified address from a particular cache level to the next lower hierarchical level when the specified address is not stored in the cache memory at that particular cache level; and passing the old data, from a particular cache level that is at a lower hierarchical level than the highest hierarchical level, up to the next higher hierarchical level when the specified address is found in the cache memory at the particular cache level that is at a lower hierarchical level and a miss signal has issued from the next higher hierarchical level.

25. The method of claim 24, further comprising:

writing the old data to the cache memory at a particular cache level that received the old data from a lower hierarchical level when the particular cache level that received the old data is designated for write allocation and is at or below the hierarchical level indicated by the cache level code.

26. The method of claim 25, further comprising:

writing the new data to the cache memory at a particular cache level when the old data is in the cache memory at that particular cache level and that particular cache level is either at the highest hierarchical level or at a hierarchical level above which each of the hierarchical levels is designated as a write-through cache level.

* * * * *